(12) United States Patent
Olarig et al.

(10) Patent No.: US 10,255,134 B2
(45) Date of Patent: Apr. 9, 2019

(54) CONTROL PLANE METHOD AND APPARATUS FOR PROVIDING ERASURE CODE PROTECTION ACROSS MULTIPLE STORAGE DEVICES

(71) Applicant: Samsung Electronics Co., Ltd., Suwon-si, Gyeonggi-do (KR)

(72) Inventors: Sompong Paul Olarig, Pleasanton, CA (US); David Schwaderer, Saratoga, CA (US); Ramdas P. Kachare, Cupertino, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 186 days.

(21) Appl. No.: 15/470,774

(22) Filed: Mar. 27, 2017

(65) Prior Publication Data

US 2018/0210785 A1    Jul. 26, 2018

Related U.S. Application Data

(60) Provisional application No. 62/448,648, filed on Jan. 20, 2017.

(51) Int. Cl.
*G06F 11/08* (2006.01)
*G06F 11/10* (2006.01)
(Continued)

(52) U.S. Cl.
CPC ........ *G06F 11/1084* (2013.01); *G06F 11/085* (2013.01); *G06F 11/108* (2013.01); *G06F 11/1008* (2013.01); *G06F 11/1076* (2013.01); *G06F 11/1088* (2013.01); *G06F 11/1092* (2013.01); *G06F 11/1096* (2013.01); *G06F 11/1469* (2013.01); *G06F 11/2087* (2013.01); *G06F 2201/84* (2013.01)

(58) Field of Classification Search
CPC ............... G06F 11/1076; G06F 11/108; G06F 11/1084; G06F 11/1088; G06F 11/1092; G06F 11/1096; G06F 11/2087; G06F 11/1008; G06F 11/085; G06F 11/1469
See application file for complete search history.

(56) References Cited

U.S. PATENT DOCUMENTS

6,397,347 B1 * 5/2002 Masuyama ......... G06F 11/1084
711/114
9,519,578 B1    12/2016 Kuzmin et al.
(Continued)

*Primary Examiner* — Paul Contino
(74) *Attorney, Agent, or Firm* — Lewis Roca Rothgerber Christie LLP (57) ABSTRACT

A system and method for providing erasure code protection across multiple storage devices. A data switch in a storage system connects a plurality of storage devices to a remote host. Each storage device is also connected to a controller, e.g., a baseboard management controller. During normal operation, read and write commands from the remote host are sent to respective storage devices through the data switch. When a write command is executed, the storage device executing the command sends a copy of the data to the controller, which generates and stores erasure codes, e.g., on a storage device that is dedicated to the storage of erasure codes, and invisible to the remote host. When a device fails or is removed, the controller reconfigures the data switch to redirect all traffic addressed to the failed or absent storage device to the controller, and the controller responds to host commands in its stead.

20 Claims, 5 Drawing Sheets

(51) Int. Cl.
*G06F 11/14* (2006.01)
*G06F 11/20* (2006.01)

(56) References Cited

U.S. PATENT DOCUMENTS

| | | | |
|---|---|---|---|
| 9,529,542 B2 | 12/2016 | Friedman et al. | |
| 9,785,495 B1* | 10/2017 | Lazier | G06F 11/0709 |
| 9,792,179 B1* | 10/2017 | Lazier | G06F 11/1076 |
| 2003/0217305 A1* | 11/2003 | Krehbiel, Jr. | G06F 11/2094 |
| | | | 714/6.1 |
| 2005/0228943 A1* | 10/2005 | DeCenzo | G06F 11/1076 |
| | | | 711/114 |
| 2007/0050568 A1* | 3/2007 | Elliott | G06F 11/2092 |
| | | | 711/154 |
| 2010/0199123 A1* | 8/2010 | Cohen | G06F 11/1662 |
| | | | 714/4.1 |
| 2011/0283150 A1* | 11/2011 | Konishi | G06F 11/0727 |
| | | | 714/42 |
| 2014/0281688 A1* | 9/2014 | Tiwari | G06F 11/2069 |
| | | | 714/6.22 |
| 2015/0100821 A1* | 4/2015 | Sakurai | G06F 11/1092 |
| | | | 714/6.23 |
| 2015/0234612 A1* | 8/2015 | Himelstein | G06F 3/0619 |
| | | | 714/6.21 |
| 2015/0255130 A1 | 9/2015 | Lee et al. | |
| 2015/0370656 A1* | 12/2015 | Tsafrir | G06F 11/1088 |
| | | | 714/6.3 |
| 2016/0057226 A1* | 2/2016 | Bestler | G06F 11/1076 |
| | | | 709/217 |
| 2016/0162202 A1 | 6/2016 | Singhai et al. | |
| 2016/0179824 A1* | 6/2016 | Donlan | G06F 17/30073 |
| | | | 707/662 |
| 2018/0046543 A1* | 2/2018 | Canepa | G06F 11/1072 |
| 2018/0150351 A1* | 5/2018 | Li | G06F 11/1008 |
| 2018/0203765 A1* | 7/2018 | Critchley | G06F 11/1088 |

* cited by examiner

CONTROL PLANE METHOD AND APPARATUS FOR PROVIDING ERASURE CODE PROTECTION ACROSS MULTIPLE STORAGE DEVICES

CROSS-REFERENCE TO RELATED APPLICATION(S)

The present application claims priority to and the benefit of U.S. Provisional Application No. 62/448,648, filed Jan. 20, 2017, entitled "CONTROL PLANE METHOD AND APPARATUS FOR PROVIDING ERASURE CODE DATA PROTECTION ACROSS MULTIPLE NVME OVER FABRICS STORAGE DEVICES (ESSDS)", the entire content of which is incorporated herein by reference.

FIELD

One or more aspects of embodiments according to the present invention relate to data storage, and more particularly to a storage system with a controller for providing erasure code protection.

BACKGROUND

With nonvolatile memory express (NVMe) over Fabrics (NVM-f) configurations, e.g., configurations using Ethernet-attached NVMe solid state drives (SSDs), improving Ethernet and SSD cost and performance may be challenging. For example, Ethernet speed has increased with the advent of 50G/100G technology, while SSD performance may depend on the Peripheral Component Interconnect Express (PCIe) interface and NANDs technology. Fabric-attached SSDs may present additional unique design challenges for supporting erasure code data protection because each device may provide point-to-point connectivity. A RAID on a chip (ROC) application specific integrated circuit (ASIC) may be used to provide data protection, but may increase latency and cost, and degrade performance.

Thus, there is a need for an improved system and method of storing data in a plurality of storage devices.

SUMMARY

Aspects of embodiments of the present disclosure are directed toward a system and method for providing erasure code protection across multiple storage devices. A data switch in a storage system connects a plurality of storage devices to a remote host. Each storage device is also connected to a controller, e.g., a baseboard management controller. During normal operation, read and write commands from the remote host are sent to respective storage devices through the data switch. When a write command is executed, the storage device executing the command sends a copy of the data to the controller, which generates and stores erasure codes, e.g., on a storage device that is dedicated to the storage of erasure codes, and invisible to the remote host. When a device fails or is removed, the controller reconfigures the data switch to redirect all traffic addressed to the failed or absent storage device to the controller, and the controller responds to host commands with the same command responses as the failed or absent storage device would have sent were it present and operating correctly.

According to an embodiment of the present invention there is provided a storage system having a storage interface, the system including: a plurality of storage devices, configured to store erasure codes sufficient to recover data stored on any one of the plurality of storage devices from data on the other storage devices; a data switch, configured during normal operation to route storage commands received through the storage interface to respective ones of the plurality of storage devices, according to a respective address in each storage command; and a controller, the controller being configured, in the event of failure or absence of any storage device of the plurality of storage devices: to reconfigure the data switch to route storage commands addressed to the failed or absent storage device to the controller; and to send, in response to each received storage command, the same command response, through the data switch and through the storage interface, as the failed or absent device would have sent were it present and operating correctly.

In one embodiment, each of the storage devices is configured, during normal operation, upon receipt of a write command including a data block, to store the data block and to send a copy of the data block to the controller.

In one embodiment, the controller is configured, upon receipt of a copy of a data block from a first storage device of the plurality of storage devices, to generate erasure codes sufficient to recover the data block, and to store the erasure codes on one or more storage devices other than the first storage device, from among the plurality of storage devices.

In one embodiment, a first storage device of the plurality of storage devices is configured, during normal operation, upon receipt of a write command including a data block; to generate erasure codes sufficient to recover the data block; and to store the erasure codes on one or more storage devices other than the first storage device, from among the plurality of storage devices.

In one embodiment, a first storage device of the plurality of storage devices is configured to store erasure codes; and the data switch is configured, during normal operation, to route each storage command received through the storage interface to a respective storage device of a subset of the plurality of storage devices, according to a respective address in the storage command, the first storage device not being a member of the subset.

In one embodiment, the controller is configured, in the event of failure or absence of any one of the plurality of storage devices, in response to a received read command requesting a data block: to read erasure codes from the present and correctly operating storage devices of the plurality of storage devices; to recover the data block; and to send the recovered data block through the data switch and through the storage interface as part of a command response.

In one embodiment, each of the storage devices includes a connector having a presence pin, the presence pin being connected to a respective sensing pin of the controller; and the controller is configured to detect removal of any one of the storage devices by a change in a voltage or current at the respective sensing pin.

In one embodiment, the data switch is an Ethernet switch.

In one embodiment, the data switch has a PCIe control port, connected to a port of the controller, and the data switch is configured to receive configuration commands from the controller through the PCIe control port.

In one embodiment, the system includes a PCIe switch, wherein each of the plurality of storage devices is connected to the controller through the PCIe switch.

In one embodiment, the controller is a baseboard management controller.

According to an embodiment of the present invention there is provided a method of operating a storage system having a storage interface and including a plurality of storage devices, a data switch, and a controller, the method including: during normal operation, routing storage commands received through the storage interface to respective ones of the plurality of storage devices, according to a respective address in each storage command; and in the event of failure or absence of any storage device of the plurality of storage devices: reconfiguring the data switch, by the controller, to route storage commands addressed to the failed or absent storage device to the controller; and sending, by the controller, in response to each received storage command, the same command response, through the data switch and through the storage interface, as the failed or absent device would have sent were it present and operating correctly.

In one embodiment, the method includes, during normal operation, upon receipt, by a storage device of the plurality of storage devices, of a write command including a data block: storing, by the storage device, the data block; and sending, by the storage device, a copy of the data block to the controller.

In one embodiment, the method includes, upon receipt, by the controller, of a copy of a data block from a first storage device of the plurality of storage devices: generating, by the controller, erasure codes sufficient to recover the data block; and storing, by the controller, the erasure codes on one or more storage devices other than the first storage device, from among the plurality of storage devices.

In one embodiment, the method includes, during normal operation, upon receipt by a first storage device, of the plurality of storage devices, of a write command including a data block: storing, by the first storage device, the data block; generating, by the first storage device, erasure codes sufficient to recover the data block; and storing, by the first storage device, the erasure codes on one or more storage devices other than the first storage device, from among the plurality of storage devices.

In one embodiment, a first storage device of the plurality of storage devices is configured to store erasure codes; and the method includes, during normal operation, routing each storage command received through the storage interface to a respective storage device of a subset of the plurality of storage devices, according to a respective address in the storage command, the first storage device not being a member of the subset.

In one embodiment, the method includes, in the event of failure or absence of any one of the plurality of storage devices, in response to receiving, by the controller, of a read command requesting a data block: reading, by the controller, through the PCIe switch, erasure codes from the present and correctly operating storage devices of the plurality of storage devices; recovering, by the controller, the data block; and sending, by the controller, the recovered data block through the data switch and through the storage interface as part of a command response.

In one embodiment, each of the storage devices has a presence pin connected to a respective sensing pin of the controller; and the method further includes detecting, by the controller, removal of any one of the storage devices by a change in a voltage or current at the respective sensing pin.

According to an embodiment of the present invention there is provided a storage system having a storage interface, the system including: a plurality of storage devices, configured to store erasure codes sufficient to recover data stored on any one of the plurality of storage devices from data on the other storage devices; a data switch, configured during normal operation to route storage commands received through the storage interface to respective ones of the plurality of storage devices, according to a respective address in each storage command; and controlling means for, in the event of failure or absence of any storage device of the plurality of storage devices: reconfiguring the data switch to route storage commands addressed to the failed or absent storage device to the controlling means; and sending, in response to each received storage command, the same command response, through the data switch and through the storage interface, as the failed or absent device would have sent were it present and operating correctly.

In one embodiment, each of the storage devices is configured, during normal operation, upon receipt of a write command including a data block, to store the data block and to send a copy of the data block to the controlling means.

BRIEF DESCRIPTION OF THE DRAWINGS

These and other features and advantages of the present invention will be appreciated and understood with reference to the specification, claims, and appended drawings wherein:

DETAILED DESCRIPTION

The detailed description set forth below in connection with the appended drawings is intended as a description of example embodiments of a control plane method and apparatus for providing erasure code protection across multiple storage devices provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

A control plane may be distinguished from a data plane, in a router for example, as follows. A control plane may make decisions about where traffic (e.g., data traffic) is sent. Control plane functions may include the system configuration, management, and exchange of routing table information; the control plane may be the signaling of the network. Since control functions may not be performed on each arriving individual data packet, they may not have a strict speed constraint and may be less time-critical than functions in the data plane. The data plane, which may also be referred to as the forwarding plane, forwards traffic to the next hop along the path to the selected destination network according to control plane logic. Data plane packets may go through a router. The routers/switches use what the control plane built to dispose of incoming and outgoing frames and packets. In a storage system, a similar distinction may be made between a control plane of the storage system and a data plane of the storage system. For example, for an NVMf-based system or chassis, all Ethernet ports may be physically partitioned between Ethernet SSDs (eSSDs) and the local Ethernet switch to be the data plane, and PCI-e lanes may be used to connect eSSDs, through a PCIe switch and a controller (as discussed in further detail below) to be the control plane.

Figure 1A:
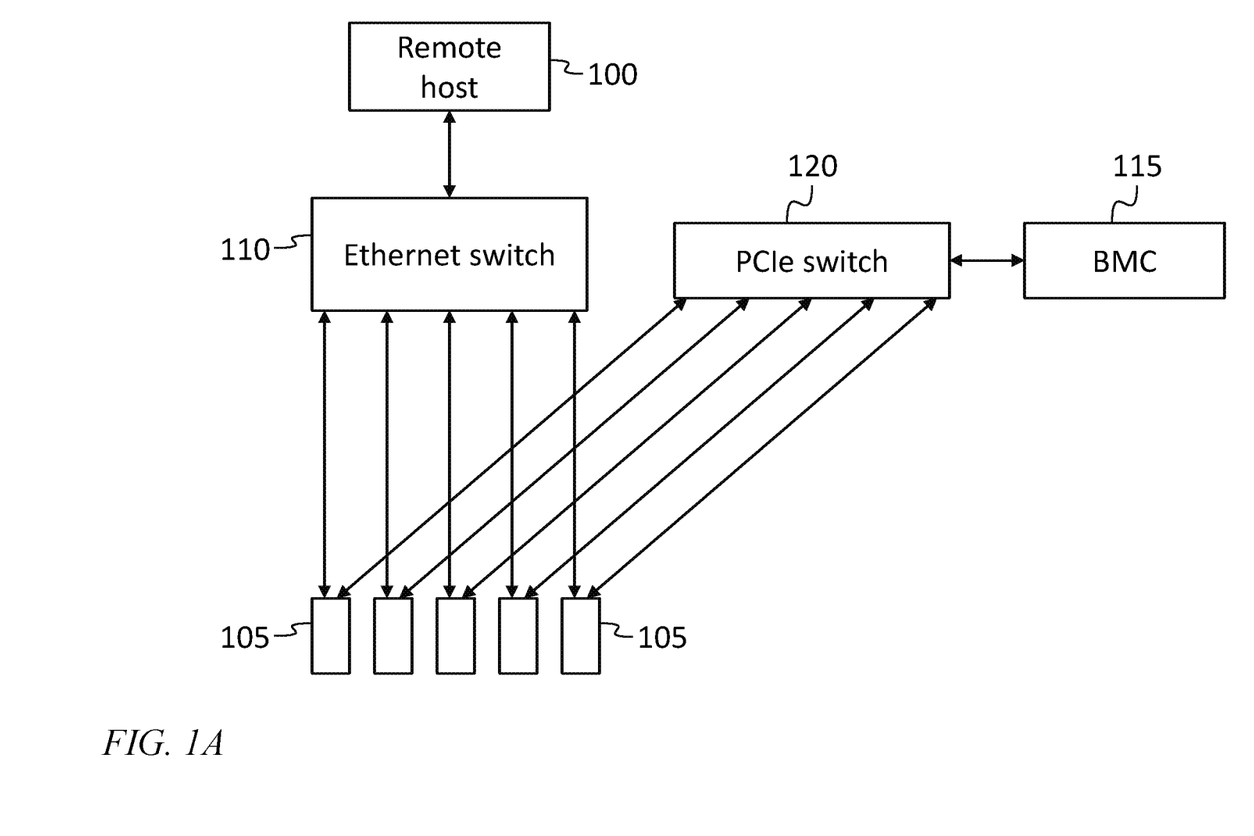
FIG. 1A is a block diagram of a remote host connected to a storage system, according to an embodiment of the present invention.

FIG. 1A shows a block diagram of a storage system connected to a remote host, according with one embodiment of the invention. The system includes an Ethernet switch 110, a PCIe switch 120, a plurality of storage devices 105 and controller 115 (e.g., a baseboard management controller). Here the plurality of storage devices 105 is in communication with the Ethernet switch 110, and the PCIe switch 120, the PCIe switch 120 is in communication with the controller 115. The storage system may be connected to a remote host 100. Additional connections may be made between the Ethernet switch 110 and the controller 115 to provide enhanced erasure code protection functionality.

Figure 1B:
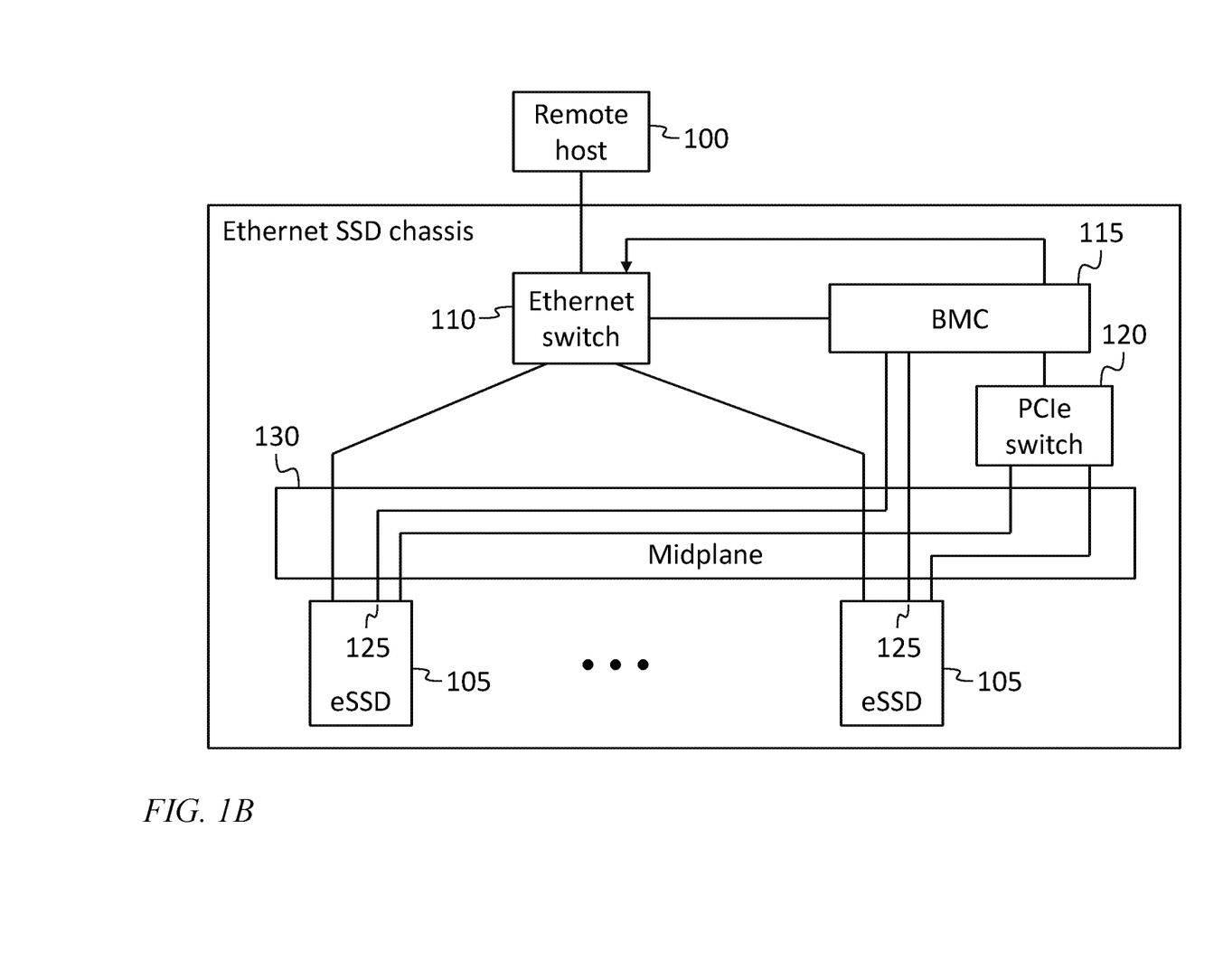
FIG. 1B is a block diagram of a remote host connected to a storage system, according to an embodiment of the present invention.

More specifically, FIG. 1B is a block diagram of a remote host 100 connected to a storage interface (e.g., an Ethernet interface) of a storage system, according to some embodiments. A plurality of storage devices 105 is connected through an Ethernet switch 110 to the remote host 100. Each of the storage devices 105 may provide persistent storage, i.e., storage of data that persists if power is temporarily lost. Each storage device 105 may be a solid state drive (SSD), e.g., an Ethernet SSD (eSSD). In normal operation, the remote host 100 may send, to the storage devices 105, storage commands, each storage command being addressed to one or more of the storage devices 105, and the storage devices 105 may send command responses to the remote host 100. The storage commands may be write commands and/or read commands. For example, to store data in a storage device 105, the remote host 100 may send a write command to the storage device 105 (the command being addressed to the storage device 105, e.g., using the storage device's Ethernet address).

Each write command may include a quantity of data (or "data block") to be written to a storage device 105, and a logical block address (LBA) by which the host may refer to the same data in a future read command. In response, the storage device 105 may store the data and, once the storage operation is complete, it may send a command response (e.g., a command completion) to the remote host 100 to signal that the storage operation was successfully completed. As used herein, a "data block" is a data payload in a storage command or in a command response, e.g., data to be written to persistent storage, in a write command, or data read from persistent storage, in a read command.

To read data from a storage device 105, the remote host 100 may send a read command to the storage device 105, requesting data from the storage device 105. In response, the storage device 105 may read the data from nonvolatile memory internal to the storage device 105 and, once the read operation is complete, it may send a command response (e.g., a command completion) to the remote host 100 including the data block of data read from storage, and signaling that the read operation was successfully completed.

Erasure codes may be used in the storage system to protect the stored data in the event of failure or removal of one of the storage devices 105. The erasure codes for a data block may include (e.g., consist of) redundant additional information that may be used to reconstruct the data in the data block if a portion of the data are lost. The erasure codes may generally be stored on a separate storage device 105 from the data that they protect, so that the failure or removal of either storage device will not result in loss of the data; if the disk storing the erasure codes fails or is removed, the data are unaffected, and if the disk storing the data fails or is removed, the data may be recovered from the erasure codes.

In some embodiments, one or more of the storage devices 105 are dedicated to the storage of erasure codes only. In this case the Ethernet switch 110 may be configured to hide these storage devices 105 from the remote host 100, so that they are invisible to the remote host 100. In such a configuration, from the perspective of the remote host 100, the storage system may appear to include fewer storage devices 105 than are present in the physical storage device, and the reliability of the storage may be enhanced by the erasure code protection provided by the storage devices 105 dedicated to the storage of erasure codes. In other embodiments the erasure codes are not stored only on storage devices 105 that are dedicated to the storage of erasure codes only, but are instead stored on drives that also store other data.

The erasure codes may be generated by the controller 115. The controller 115 may be connected to each of the storage devices 105 through a PCIe switch 120. The controller 115 and the PCIe switch 120 and their connections to the storage devices 105 may form a control plane, and the Ethernet switch 110 and its connections to the storage devices 105 may form a data plane. In operation, when a storage device 105 receives a write command through the Ethernet switch 110, it may store the data (i.e., the data of the data block included in the write command) in nonvolatile memory internal to the storage device 105, and send a copy of the data, as well as the logical block address, to the controller 115. The controller 115 then generates erasure codes and stores them, e.g., on a storage device 105 different from the one that received the write command, by sending a write command through the PCIe switch to the storage device 105 that is to store the erasure code data. The controller 115 may maintain a table listing the logical block addresses for which it has stored erasure codes, and the respective locations of the erasure codes. In normal operation, the controller 115 may be transparent to the data path between the remote host 100 and the storage device 105, e.g., data may travel directly between the remote host 100 and the storage device 105 without passing through the controller 115.

Each storage device 105 (e.g. SSD) may include a storage interface connector that may be a U.2 connector. A plurality of pins of the U.2 connector may be allocated to provide a PCIe link (e.g., one by four PCIe lanes or two by two PCIe lanes) for communication with the PCIe switch 120. Other pins of the U.2 connector may be allocated to provide an Ethernet connection to the Ethernet switch 110. A further pin 125 of the U.2 connector may be used as a "presence pin" to allow the controller 115 to detect whether a storage device 105 is present. For example, each storage device 105 may supply a set voltage to or drive a set current through the presence pin 125. The presence pin 125 of each storage device 105 may be connected to a respective sensing pin of the controller 115, and the controller may infer, if it ceases to detect the set voltage or the set current at one of its sensing pins, that the corresponding storage device 105 is no longer present.

In other embodiments an NVMe management interface (NVMe-MI) connection between the storage device 105 and the controller 115 may be used for the same purpose, with, e.g., multiple pins per storage device 105 providing the physical connection for the NVMe management interface and acting as presence pins.

Each storage device 105 may be connected to a mid-plane 130, which may be a printed circuit board with a plurality (e.g., 24) of U.2 connectors to accommodate a corresponding plurality of storage devices 105. The mid-plane 130 may include conductive traces forming connections between the connectors connected to the storage devices 105 and a corresponding plurality of connectors (e.g., 24 connectors) on the storage-device side of the PCIe switch 120. The mid-plane 130 may also provide connections between the presence pins of the storage devices 105 and the corresponding sensing pins of the controller 115, and between the Ethernet pins of the storage devices 105 and the corresponding pins of connectors on the storage-device side of the Ethernet switch 110.

Each storage device 105 may include a plurality of nonvolatile memory (e.g., flash memory) chips and a storage device controller (e.g., an SSD controller, which is separate and distinct from the controller 115 of the storage system) which may be or include a processing circuit, discussed in further detail below. The controller 115 may also be or include a processing circuit. The controller 115 may be a baseboard management controller (BMC) including such features as an ability to perform temperature monitoring and control for the storage system, e.g., through a temperature sensor external to the baseboard management controller and connected to corresponding pins of the baseboard management controller, and/or an ability to perform fan control through an $I^2C$ interface or SMBus. As used herein "controlling means" refers to any combination of hardware, firmware, and software that implements a controller 115 having at least the features disclosed and claimed herein, and may be implemented entirely in hardware, or implemented in software executing on a general-purpose processing circuit (e.g., on a general-purpose CPU).

Figure 1C:
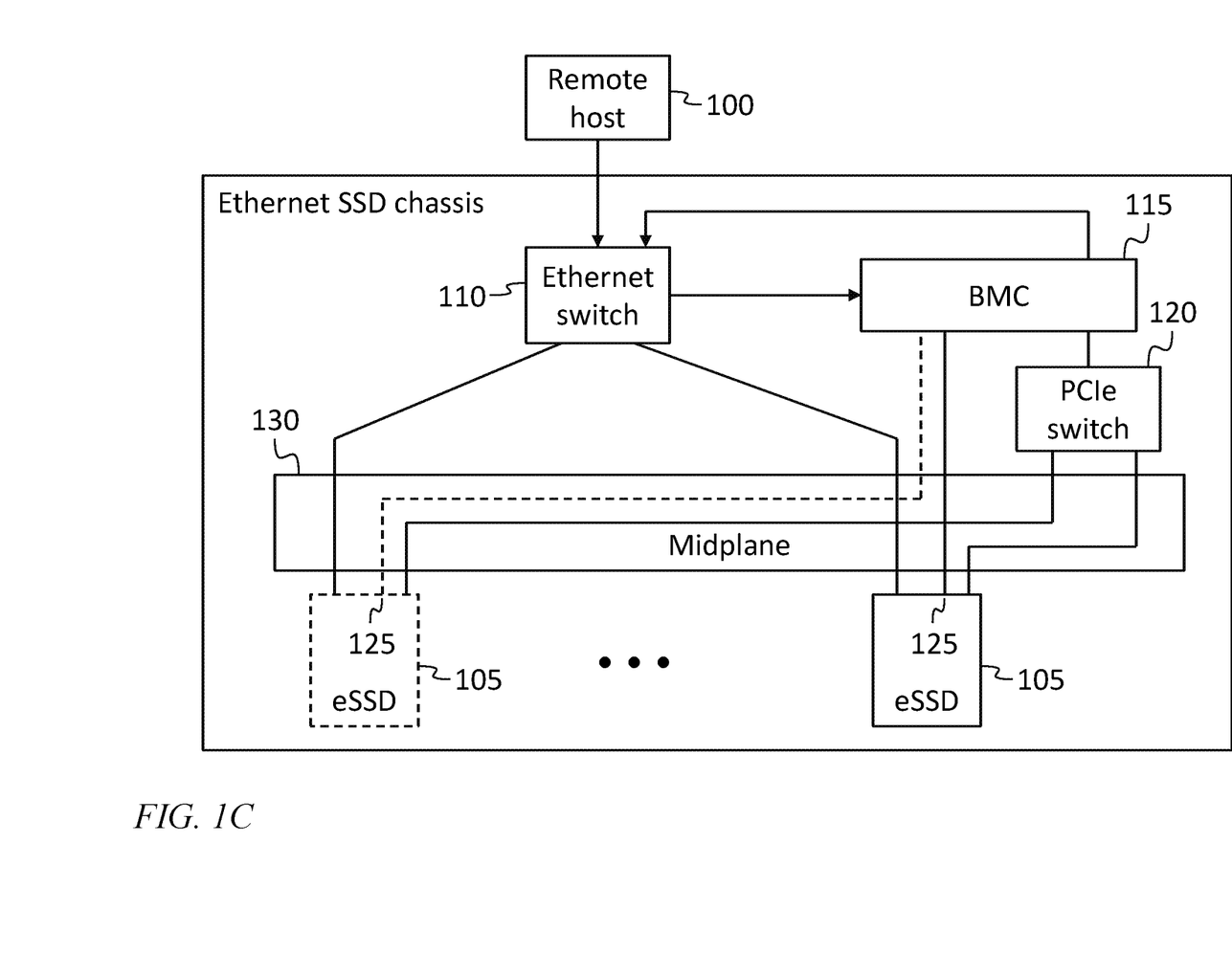
FIG. 1C is a block diagram of a remote host connected to a storage system, according to an embodiment of the present invention.

When a storage device 105 fails or is removed, (as illustrated by the dashed lines of FIG. 1C) the controller 115 may become aware of the absence or failure as a result of changes at the controller's sensing pins as described above, or the controller may be notified, by the Ethernet switch 110, that storage commands being sent to one of the storage devices 105 are not resulting in command responses.

As described in further detail below, in some embodiments, in normal operation, when a write command is executed, the data to be stored are written to one or more storage devices 105, and erasure codes are generated and also written to one or more storage devices 105, with the erasure codes stored, for example, on storage devices 105 different from the data that the erasure codes protect, so that the failure of any one storage device ordinarily will not result in irrecoverable data loss. When a storage device 105 fails, the controller 115 may reconfigure the Ethernet switch 110 to redirect, to the controller, any read or write commands addressed to the failed storage device 105, and the controller 115 may emulate the behavior of the storage device 105, so that the failure of the storage device 105 is not perceptible to the remote host 100, except as a reduction in performance (e.g., speed).

The storage system may include a complex programmable logic device (CPLD) (not shown in FIGS. 1B and 1C) connected between the respective presence pins 125 of the storage devices 105 and the controller 115. After detecting any change in at least one of the presence pins, the CPLD may notify the controller 115 via interrupt. The controller 115 may then poke (e.g., read or write) some registers in the CPLD to find out which drive has (or which drives have) been removed or installed. This may enable BMC to make any appropriate changes such as reconfiguring the Ethernet switch by enabling or disabling certain ports.

In some embodiments, the controller 115 then reconfigures the Ethernet switch 110 to redirect all Ethernet traffic addressed to the failed or absent storage device 105 so that this traffic is instead forwarded to the controller 115. The controller then handles storage commands from the remote host and sends command responses so that the remote host 100 receives the same command responses as it would have, had the storage device 105 not failed or been removed.

For example, in response to a read command from the remote host 100 addressed to the failed or absent storage device 105 and redirected to the controller 115, the controller 115 may recover, from erasure codes (e.g., erasure parity and data codes) stored on one or more other storage devices 105, the data that would have been read (e.g., the data may be regenerated by XOR operation, to gracefully recover the data from the failed/absent storage drive 105) from the failed or absent storage device 105 were it still present and operating correctly, and the controller 115 may send, to the remote host 100, a command response containing the recovered data.

In response to a write command from the remote host 100 addressed to the failed or absent storage device 105 and redirected to the controller 115, the controller 115 may generate and store the same erasure codes that would have been stored if the failed or absent storage device 105 were still present and operating correctly, and send, to the remote host 100, the same command response that the failed or absent storage device 105 would have sent, were it still present and operating correctly. In some embodiments, after a storage device 105 fails, the controller 115, during continued operation of the system, reconfigures the system to operate with one fewer drive by generating new data and erasure codes to replace any that were lost when the storage device 105 failed, storing the new data and erasure codes on one or more of the remaining storage devices 105, and moving data (and erasure codes) between the remaining storage devices 105, until it is again the case that all data are protected by erasure codes, and that each erasure code is stored on a storage devices 105 different from the data it protects. The controller may take the same actions if (instead of failing) a storage device 105 is removed.

When a replacement drive is subsequently installed, the controller 115 may, during the continued operation of the system, and while continuing to respond on behalf of the failed or absent storage device 105, rebuild the replacement drive, i.e., the controller 115 may recover the data that was on the failed or absent storage device 105 and store it in the replacement drive. Once the replacement drive has been rebuilt, the controller may reconfigure the Ethernet switch 110 for normal operation.

Figure 2:
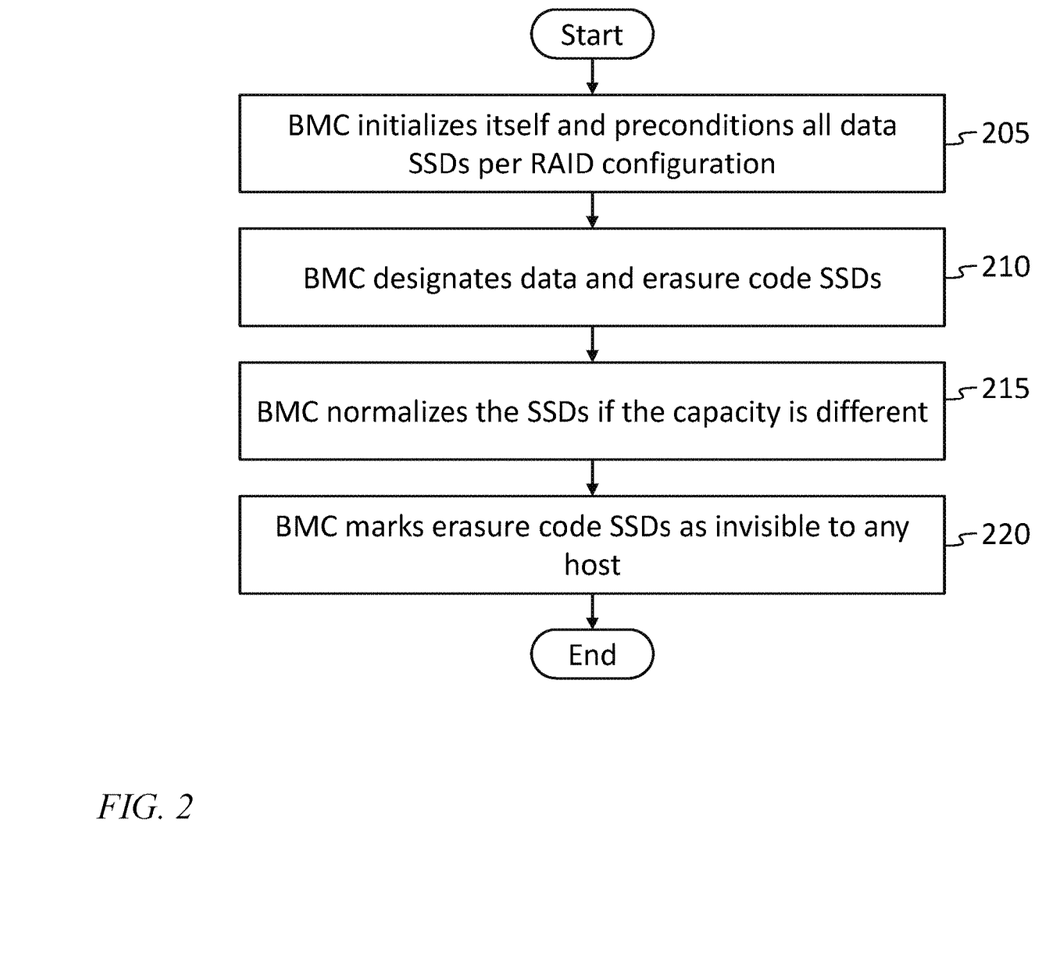
FIG. 2 is a flow chart of a method for operating a storage system, according to an embodiment of the present invention.

FIG. 2 shows a flowchart of a startup sequence for a storage system, in one embodiment. In an act 205, the controller 115 (e.g., BMC) initializes itself and preconditions all data storage devices 105 (e.g., SSDs) per a desired RAID configuration. In an act 210, the controller 115 then designates some of the storage devices 105 as data storage devices, and some of the storage devices 105 as erasure code storage devices. This may be done at initialization for all storage devices 105 and commands, or may be done on a per-command basis. In an act 215, the controller 115 then normalizes the SSDs if their respective capacities are different, and in an act 220, the controller 115 then marks the erasure code storage devices as invisible to any host, as mentioned above.

Figure 3:
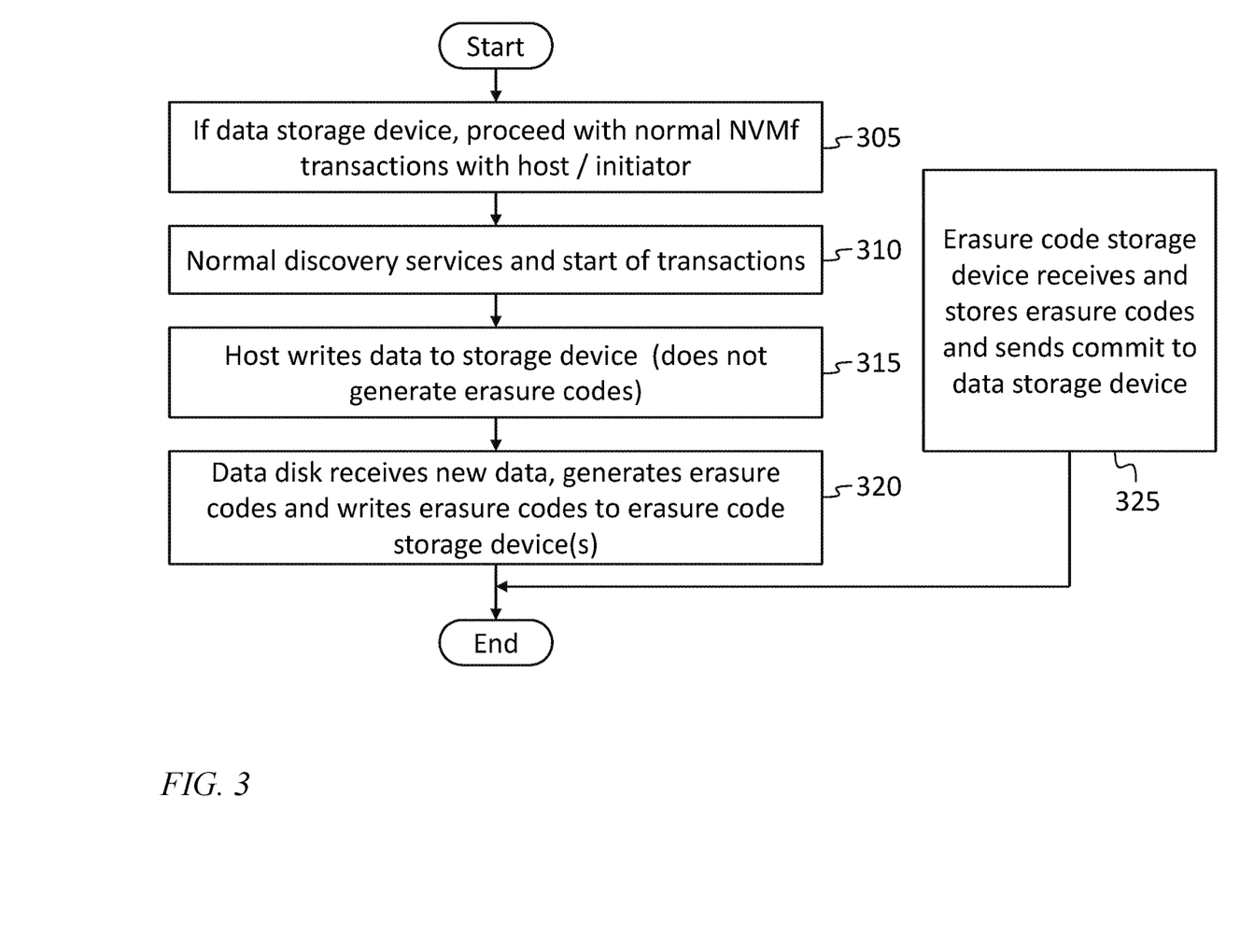
FIG. 3 is a flow chart of a method for operating a storage system, according to an embodiment of the present invention.

FIG. 3 shows a flowchart for the operation of a storage system, in an alternate embodiment, in which the storage devices 105, instead of the controller 115, generate the erasure codes. Each storage device 105 in the system has a unique array member identification, such as a slot number or an assigned number from the controller 115. Each of the data storage devices proceeds, in an act 305, to execute normal NVMe over Fabrics (NVMf) transactions with the host or initiator, and, in an act 310, performs normal discovery services and starts executing transactions (e.g., processing and responding to storage commands). In an act 315, the host writes data to one of the data storage devices. The host, in act 315, does not generate erasure codes. In an act 320, the data storage device then receives the data to be written and stores it in nonvolatile memory internal to the data storage device. In the act 320, the data storage device also generates erasure codes and writes them to one or more erasure code storage devices (of the plurality of storage devices).

For example, for any writes, the write data may be stored temporarily in a posted write buffer in the target storage device. Concurrently, the target storage device may transfer the write data to the controller 115 via the control plane (e.g., the PCIe control plane). After receiving the write data, the controller 115 may perform parity generation by reading corresponding data sharing the same LBA from other storage devices. The controller 115 may perform one or more appropriate XOR operations and write the new parity onto the parity storage device. When done, the controller 115 may send a message to the original target storage device that the posted write buffer may be flushed.

In some embodiments, several storage devices 105 store erasure codes. The erasure code storage devices, in an act 325, receive the erasure codes and store them in nonvolatile memory internal to the erasure code storage devices, and send a commit message to the data storage device. Communication between the data storage device and the erasure code storage devices may be through the PCIe switch 120.

In view of the foregoing, some embodiments provide a system and method for providing erasure code protection across multiple storage devices. A data switch in a storage system connects a plurality of storage devices to a remote host. Each storage device is also connected to a controller, e.g., a baseboard management controller. During normal operation, read and write commands from the remote host are sent to respective storage devices through the data switch. When a write command is executed, the storage device executing the command sends a copy of the data to the controller, which generates and stores erasure codes, e.g., on a storage device that is dedicated to the storage of erasure codes, and invisible to the remote host. When a device fails or is removed, the controller reconfigures the data switch to redirect all traffic addressed to the failed or absent storage device to the controller, and the controller responds to host commands with the same command responses as the failed or absent storage device would have sent were it present and operating correctly.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of" when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although example embodiments of a control plane method and apparatus for providing erasure code protection across multiple storage devices have been specifically described and illustrated herein, many modifications and variations will be apparent to those skilled in the art. Accordingly, it is to be understood that a control plane method and apparatus for providing erasure code protection across multiple storage devices constructed according to principles of this invention may be embodied other than as specifically described herein. The invention is also defined in the following claims, and equivalents thereof.

What is claimed is:

1. A storage system having a storage interface, the system comprising:
    a plurality of storage devices, configured to store erasure codes sufficient to recover data stored on any one of the plurality of storage devices from data on the other storage devices;
    a data switch, configured during normal operation to route storage commands received through the storage interface to respective ones of the plurality of storage devices, according to a respective address in each storage command; and
    a controller,
    the controller being configured, in the event of failure or absence of any storage device of the plurality of storage devices:
        to reconfigure the data switch to route storage commands addressed to the failed or absent storage device to the controller; and
        to send, in response to each received storage command, the same command response, through the data switch and through the storage interface, as the failed or absent device would have sent were it present and operating correctly.

2. The system of claim 1, wherein each of the storage devices is configured, during normal operation, upon receipt of a write command including a data block, to store the data block and to send a copy of the data block to the controller.

3. The system of claim 2, wherein the controller is configured, upon receipt of a copy of a data block from a first storage device of the plurality of storage devices, to generate erasure codes sufficient to recover the data block, and to store the erasure codes on one or more storage devices other than the first storage device, from among the plurality of storage devices.

4. The system of claim 1, wherein a first storage device of the plurality of storage devices is configured, during normal operation, upon receipt of a write command including a data block:
    to store the data block;
    to generate erasure codes sufficient to recover the data block; and
    to store the erasure codes on one or more storage devices other than the first storage device, from among the plurality of storage devices.

5. The system of claim 1, wherein:
    a first storage device of the plurality of storage devices is configured to store erasure codes; and
    the data switch is configured, during normal operation, to route each storage command received through the storage interface to a respective storage device of a subset of the plurality of storage devices, according to a respective address in the storage command, the first storage device not being a member of the subset.

6. The system of claim 1, wherein the controller is configured, in the event of failure or absence of any one of the plurality of storage devices, in response to a received read command requesting a data block:
    to read erasure codes from the present and correctly operating storage devices of the plurality of storage devices;
    to recover the data block; and
    to send the recovered data block through the data switch and through the storage interface as part of a command response.

7. The system of claim 1, wherein:
    each of the storage devices comprises a connector having a presence pin, the presence pin being connected to a respective sensing pin of the controller; and
    the controller is configured to detect removal of any one of the storage devices by a change in a voltage or current at the respective sensing pin.

8. The system of claim 1, wherein the data switch is an Ethernet switch.

9. The system of claim 1, wherein the data switch has a PCIe control port, connected to a port of the controller, and the data switch is configured to receive configuration commands from the controller through the PCIe control port.

10. The system of claim 1, further comprising a PCIe switch, wherein each of the plurality of storage devices is connected to the controller through the PCIe switch.

11. The system of claim 1, wherein the controller is a baseboard management controller.

12. A method of operating a storage system having a storage interface and comprising a plurality of storage devices, a data switch, and a controller, the method comprising:
    during normal operation, routing storage commands received through the storage interface to respective ones of the plurality of storage devices, according to a respective address in each storage command; and
    in the event of failure or absence of any storage device of the plurality of storage devices:
        reconfiguring the data switch, by the controller, to route storage commands addressed to the failed or absent storage device to the controller; and
        sending, by the controller, in response to each received storage command, the same command response, through the data switch and through the storage interface, as the failed or absent device would have sent were it present and operating correctly.

13. The method of claim 12, further comprising, during normal operation, upon receipt, by a storage device of the plurality of storage devices, of a write command including a data block:
    storing, by the storage device, the data block; and
    sending, by the storage device, a copy of the data block to the controller.

14. The method of claim 13, further comprising, upon receipt, by the controller, of a copy of a data block from a first storage device of the plurality of storage devices:
    generating, by the controller, erasure codes sufficient to recover the data block; and
    storing, by the controller, the erasure codes on one or more storage devices other than the first storage device, from among the plurality of storage devices.

15. The method of claim 12, further comprising, during normal operation, upon receipt by a first storage device, of the plurality of storage devices, of a write command including a data block:
   storing, by the first storage device, the data block;
   generating, by the first storage device, erasure codes sufficient to recover the data block; and
   storing, by the first storage device, the erasure codes on one or more storage devices other than the first storage device, from among the plurality of storage devices.

16. The method of claim 12, wherein:
   a first storage device of the plurality of storage devices is configured to store erasure codes; and
   the method comprises, during normal operation, routing each storage command received through the storage interface to a respective storage device of a subset of the plurality of storage devices, according to a respective address in the storage command, the first storage device not being a member of the subset.

17. The method of claim 12, wherein the system further has a PCIe switch and the controller is connected to the storage devices through the PCIe switch,
   the method further comprising, in the event of failure or absence of any one of the plurality of storage devices, in response to receiving, by the controller, of a read command requesting a data block:
   reading, by the controller, through the PCIe switch, erasure codes from the present and correctly operating storage devices of the plurality of storage devices;
   recovering, by the controller, the data block; and
   sending, by the controller, the recovered data block through the data switch and through the storage interface as part of a command response.

18. The method of claim 17, wherein each of the storage devices has a presence pin connected to a respective sensing pin of the controller; and
   the method further comprises detecting, by the controller, removal of any one of the storage devices by a change in a voltage or current at the respective sensing pin.

19. A storage system having a storage interface, the system comprising:
   a plurality of storage devices, configured to store erasure codes sufficient to recover data stored on any one of the plurality of storage devices from data on the other storage devices;
   a data switch, configured during normal operation to route storage commands received through the storage interface to respective ones of the plurality of storage devices, according to a respective address in each storage command; and
   controlling means for, in the event of failure or absence of any storage device of the plurality of storage devices:
      reconfiguring the data switch to route storage commands addressed to the failed or absent storage device to the controlling means; and
      sending, in response to each received storage command, the same command response, through the data switch and through the storage interface, as the failed or absent device would have sent were it present and operating correctly.

20. The system of claim 19, wherein each of the storage devices is configured, during normal operation, upon receipt of a write command including a data block, to store the data block and to send a copy of the data block to the controlling means.

* * * * *